No. 683,671.  
W. TRON.  
VEHICLE ROLLER CHAFE IRON.  
(Application filed Feb. 15, 1901.)  
Patented Oct. 1, 1901.

(No Model.)

WITNESSES:  
INVENTOR  
William Tron  
BY  
V. H. Lockwood  
His ATTORNEY.

UNITED STATES PATENT OFFICE.

WILLIAM TRON, OF INDIANAPOLIS, INDIANA.

VEHICLE ROLLER CHAFE-IRON.

SPECIFICATION forming part of Letters Patent No. 683,671, dated October 1, 1901.

Application filed February 15, 1901. Serial No. 47,523. (No model.)

*To all whom it may concern:*

Be it known that I, WILLIAM TRON, of Indianapolis, county of Marion, and State of Indiana, have invented a certain new and useful Vehicle Roller Chafe-Iron; and I do hereby declare that the following is a full, clear, and exact description thereof, reference being had to the accompanying drawings, in which like numerals refer to like parts.

The object of this invention is to provide a chafe-iron for vehicles which is cheap and simple to make and apply and is especially adapted for use in connection with rubber-tired wheels.

One feature of the invention consists in mounting or supporting the rollers by means of a ball at each end that cheapens and simplifies the construction and also renders the roller readily rotatable.

The features of the invention will more fully appear from the accompanying drawings and the following description and claims.

Figure 1:
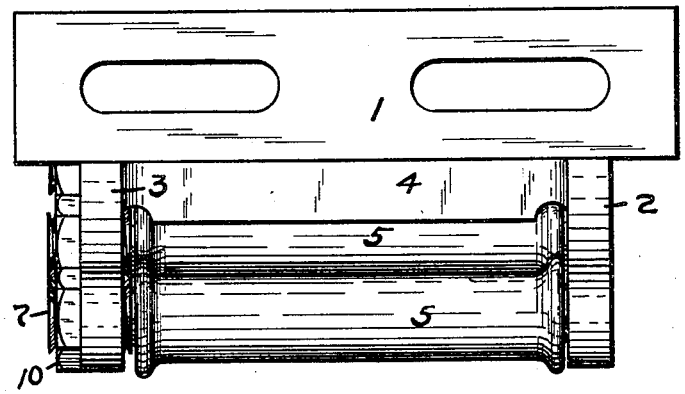
Figure 2:
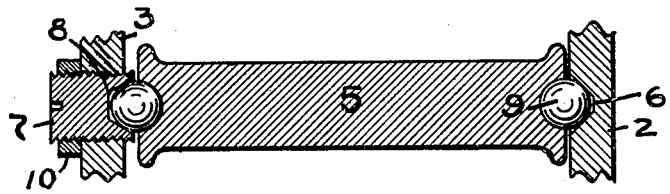
Figure 3:
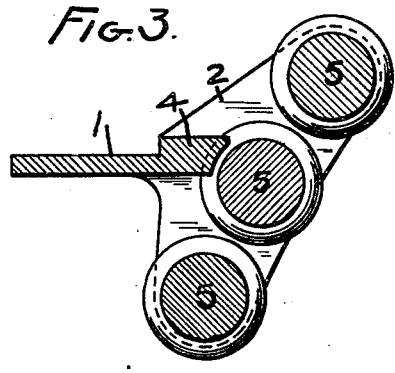

In the drawings, Figure 1 is a plan of the chafe-iron. Fig. 2 is a central longitudinal section of one of the rollers and its mounting, and Fig. 3 is a vertical transverse section of the chafe-iron.

In detail a frame is made in the first place consisting of a plate 1 for attaching it to the body of a vehicle and a pair of arms 2 and 3, which extend from said plate 1 parallel and are strengthened by the the rib 4, which is practically a continuation of the plate 1, up to the roller 5. The arm 2 is provided with three ball-seats 6 in its inner face. The arm 3 has internally-threaded apertures to receive the threaded bolts 7, which have in their inner face a ball-seat 8. The rollers 5 are mounted between said arms and have at each end a ball-seat centrally located, whereby they can be supported between said arms by means of a ball 9 at each end, as appears in Fig. 2. In assembling the parts the ball is first placed in the seat 6 of the arm 2 and the roller 5 put in place against said ball. The other ball is then put in place at the other end of the roller and the bolt 7 screwed down against the last-mentioned ball. The bolt 7 is locked in place by the nut 10. When thus mounted, the roller 5 readily rotates on the two balls 9 and is prevented by them from escaping even when the roller is under strain.

I show herein three rollers 5, carried by the arms 2 and 3, placed parallel and close to each other and arranged in the arc of a circle, so that they will conform to the curvature of the vehicle-tire and simultaneously receive the pressure from said tire or engage said tire, whereby the pressure is distributed to all three rollers, so that no one of them will embed itself into the rubber to such extent as to interfere with the ready rotation of the roller or to injure the rubber of the tire.

What I claim as my invention, and desire to secure by Letters Patent, is—

1. A vehicle chafe-iron including a frame with a pair of arms, a roller, and a ball between each end of the roller and said arms for supporting the roller.

2. A vehicle chafe-iron including a frame with a pair of arms one of which has a ball-seat in it and the other a threaded aperture, a bolt in said aperture with a ball-seat in it, a roller with a central ball-seat in each end, and a ball in the seats at each end of the roller.

In witness whereof I have hereunto affixed my signature in the presence of the witnesses herein named.

WM. TRON.

Witnesses:
LAURA HITT,
V. H. LOCKWOOD.